United States Patent
Chen et al.

(10) Patent No.: US 9,560,701 B2
(45) Date of Patent: Jan. 31, 2017

(54) DRIVING CIRCUIT AND LAMPS

(71) Applicant: LEXTAR ELECTRONICS CORPORATION, Hsinchu (TW)

(72) Inventors: Chun-Kuang Chen, Taipei (TW); Po-Shen Chen, New Taipei (TW); Feng-Ling Lin, Pingtung (TW); Hui-Ying Chen, Hemei Township (TW); Tung-Yu Chen, Tainan (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 289 days.

(21) Appl. No.: 13/654,483

(22) Filed: Oct. 18, 2012

(65) Prior Publication Data

US 2013/0093349 A1    Apr. 18, 2013

(30) Foreign Application Priority Data

Oct. 18, 2011   (TW) .............................. 100137646 A

(51) Int. Cl.
| | | |
|---|---|---|
| *H05B 41/16* | (2006.01) | |
| *H05B 41/24* | (2006.01) | |
| *H05B 33/08* | (2006.01) | |
| *H02M 7/06* | (2006.01) | |
| *H02M 1/00* | (2006.01) | |

(52) U.S. Cl.
CPC ......... *H05B 33/0809* (2013.01); *H02M 7/064* (2013.01); *H02M 2001/008* (2013.01); *H05B 33/0884* (2013.01); *H05B 33/0887* (2013.01); *Y02B 20/341* (2013.01); *Y02B 20/348* (2013.01)

(58) Field of Classification Search
CPC .... H05B 33/0887; H05B 41/2983; H02H 9/02
See application file for complete search history.

(56) References Cited

U.S. PATENT DOCUMENTS

| | | | | |
|---|---|---|---|---|
| 3,588,864 | A * | 6/1971 | Gaulke | ........................... 61/170 |
| 4,571,531 | A * | 2/1986 | Lin | ............................... 320/134 |
| 4,672,290 | A * | 6/1987 | Ghosh | ....................... H02P 1/44 |
| | | | | 318/816 |
| 4,700,380 | A * | 10/1987 | Ahuja | ............................ 379/177 |
| 4,853,607 | A * | 8/1989 | Walter | .................. H02J 7/0091 |
| | | | | 320/154 |
| 5,424,908 | A * | 6/1995 | Kanetake | ................. H01G 9/08 |
| | | | | 361/523 |

(Continued)

*Primary Examiner* — Anh Tran
(74) *Attorney, Agent, or Firm* — Moser Taboada

(57) ABSTRACT

The invention relates to a driving circuit comprising a first bridge circuit, a second bridge circuit, a first protection device and a second protection device. The first bridge circuit comprising a first positive input terminal, a first negative input terminal, a first positive output terminal and a first negative output terminal is coupled to an AC voltage source to output a first voltage. The second bridge circuit comprising a second positive input terminal, a second negative input terminal, a second positive output terminal and a second negative output terminal is coupled to the AC voltage source to output a second voltage. The second and the first negative output terminals are both coupled to the ground potential. The first protection device is coupled between the second positive input terminal and the AC voltage source. The second protection device is coupled between the second negative input terminal and the AC voltage source.

5 Claims, 6 Drawing Sheets

(56) References Cited

U.S. PATENT DOCUMENTS

| | | | | |
|---|---|---|---|---|
| 5,424,909 | A * | 6/1995 | Kuriyama | H01G 9/0003 361/523 |
| 5,534,768 | A * | 7/1996 | Chavannes et al. | 323/267 |
| 7,450,408 | B2 * | 11/2008 | Tan et al. | 363/132 |
| 7,602,158 | B1 * | 10/2009 | Iacob | H02M 3/33523 307/17 |
| 2002/0012258 | A1 * | 1/2002 | Nagai et al. | 363/95 |
| 2007/0015416 | A1 * | 1/2007 | Gutierrez et al. | 439/676 |
| 2009/0278465 | A1 * | 11/2009 | Farmer et al. | 315/209 R |
| 2009/0303720 | A1 * | 12/2009 | McGrath | 362/249.02 |
| 2010/0148680 | A1 * | 6/2010 | Yang | 315/185 S |
| 2010/0164389 | A1 * | 7/2010 | Dellian et al. | 315/182 |
| 2010/0254163 | A1 * | 10/2010 | Martini et al. | 363/17 |
| 2011/0130888 | A1 * | 6/2011 | Gerstenkorn | G05B 19/0428 700/297 |
| 2013/0051105 | A1 * | 2/2013 | Wang et al. | 363/132 |

\* cited by examiner

DRIVING CIRCUIT AND LAMPS

RELATED APPLICATIONS

This application claims priority to Taiwan Application Serial Number 100137646, filed Oct. 18, 2011, which is herein incorporated by reference.

BACKGROUND

Field of Invention

The invention relates to a driving circuit. More particularly the invention relates to a double bridge circuit having a dual buck capacitor.

Description of Related Art

In the design of circuits, a method which uses a capacitor as the impedance for limiting the current to achieve a voltage source conversion at low power has been utilized for a long time. Such a non-isolated circuit has characteristics of simple structure and low cost, and thus is used widely. However, both of the efficiency and the power factor of the circuit are poor. Currently, if two bridge circuits are used jointly, a problem of common ground may occur, so that the current feedback of one of the two bridge circuits may damage the other bridge circuit.

SUMMARY

The invention is directed to avoid damage to a double bridge circuit caused by the current feedback.

The invention uses two input terminals configured in a bridge circuit to prevent the feedback current from the other bridge circuit to avoid the circuit damage due to the current feedback.

The invention further connects a capacitor with a diode in parallel, so that the combination of the capacitor and the diode is equivalent to a non-polarized capacitor.

Other purposes and advantages of the invention can be further understood from the technical features disclosed in the invention.

In order to realize one or a part of or all of the purposes mentioned above or other purposes, an embodiment of the invention relates to a driving circuit including a first bridge circuit, a second bridge circuit, a first protection device and a second protection device. The first bridge circuit is coupled to an AC voltage source to output a first voltage. The first bridge circuit has a first positive input terminal, a first negative input terminal, a first positive output terminal and a first negative output terminal. The second bridge circuit is coupled to the AC voltage source to output a second voltage. The second bridge circuit has a second positive input terminal, a second negative input terminal, a second positive output terminal and a second negative output terminal, in which the second negative output terminal and the first negative output terminal are both coupled to the same ground potential. The first protection device is coupled between the second positive input terminal and the AC voltage source. The second protection device is coupled between the second negative input terminal and the AC voltage source.

Another embodiment of the invention provides a lamp including a driving circuit, a light emitting module and a bluetooth module. The driving circuit includes a first bridge circuit, a second bridge circuit, a first protection device and a second protection device. The first bridge circuit is coupled to an AC voltage source to output a first voltage. The first bridge circuit has a first positive input terminal, a first negative input terminal, a first positive output terminal and a first negative output terminal. The second bridge circuit is coupled to the AC voltage source to output a second voltage. The second bridge circuit has a second positive input terminal, a second negative input terminal, a second positive output terminal and a second negative output terminal, in which the second negative output terminal and the first negative output terminal are both coupled to the same ground potential. The first protection device is coupled between the second positive input terminal and the AC voltage source. The second protection device is coupled between the second negative input terminal and the AC voltage source. The light emitting module receives the first voltage and is enabled by the first voltage. The bluetooth module receives the second voltage and is enabled by the second voltage.

DETAILED DESCRIPTION

The foregoing and other technical contents, features and functions of the invention will be clearly shown in the following detailed description of embodiments with reference to the drawings. Directional phrases mentioned in the following embodiments, such as above, below, left, right, front or back, only refer to the directions in the accompanying drawings. Thus, the directional phrases are used for illustration and are not intended to limit the invention.

Figure 1:
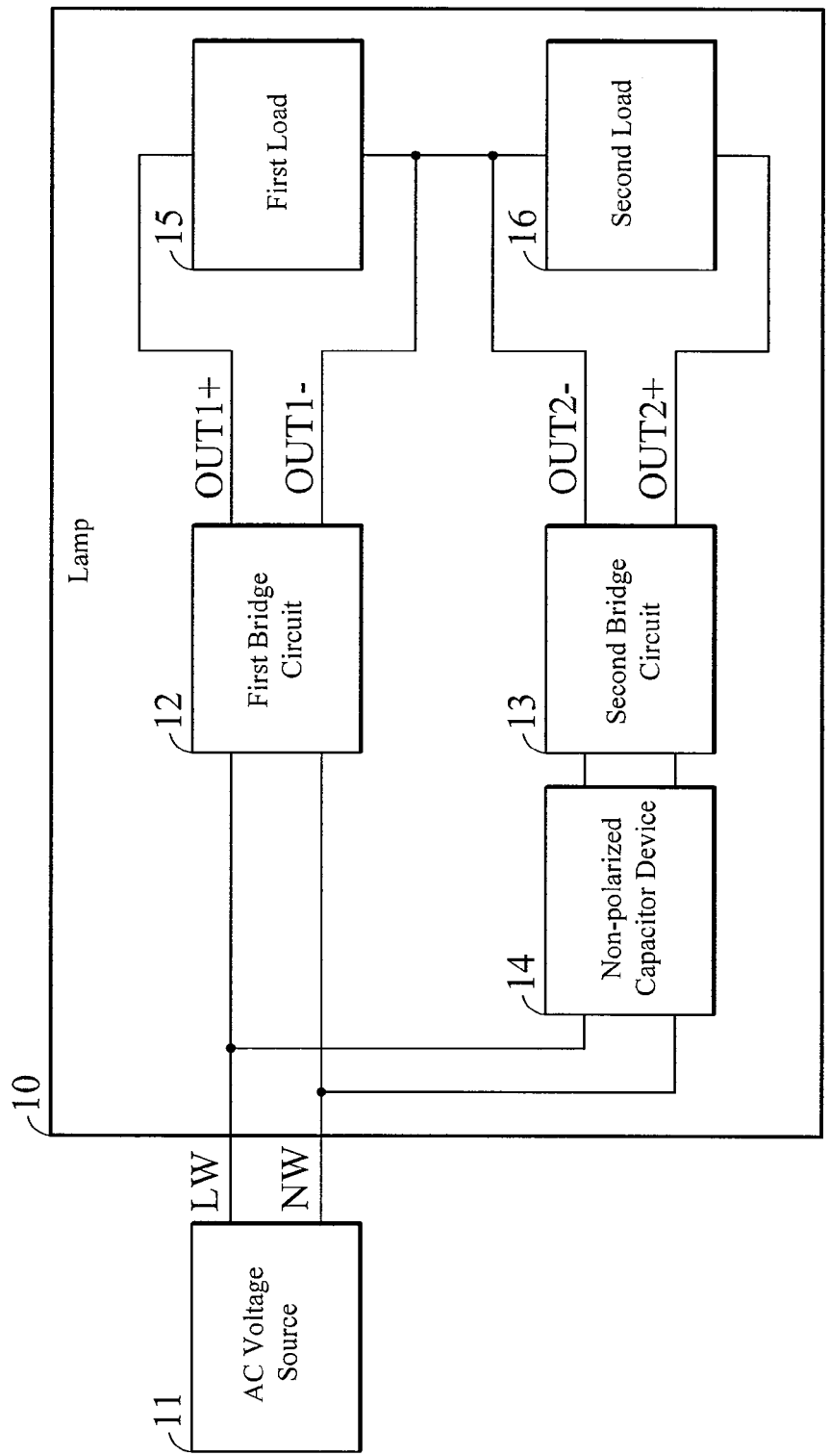
FIG. 1 is a schematic diagram of a lamp according to an embodiment of the invention.

FIG. 1 is a schematic diagram of a lamp according to one embodiment of the invention. A lamp 10 is coupled to an AC voltage source 11. The lamp 10 receives a voltage transmitted by the AC voltage source 11 to drive a first load 15 and a second load 16 in the lamp 10. The lamp 10 includes a first bridge circuit 12, a second bridge circuit 13, a non-polarized capacitor device 14, the first load 15 and the second load 16. The first bridge circuit 12 has a positive input terminal coupled to the LW output terminal of the AC voltage source 11, and a negative input terminal coupled to the NW output terminal of the AC voltage source 11. The first bridge circuit 12 outputs a first driving voltage to the first load 15 through a first positive output terminal (OUT1+) and a first negative output terminal (OUT1−). The second bridge circuit 13 is coupled to the AC voltage source 11 through the non-polarized capacitor device 14, and outputs a second driving voltage to the second load 16 through a second positive output terminal (OUT2+) and a second negative output terminal (OUT2−). The second negative output terminal (OUT2−) and the first negative output terminal (OUT1−) are both coupled to the ground potential. The non-polarized capacitor device 14 is coupled to the LW output terminal and the NW output terminal of the AC voltage source 11 to avoid that the feedback current of the first bridge circuit 12 is transmitted to the second bridge circuit 13 and damages the second bridge circuit 13.

In this embodiment, a first impedance value of the first load 15 is greater than a second impedance value of the second load 16. Thus, if the non-polarized capacitor device 14 is absent, a large current outputted to the first load 15 may be fed back to the second bridge circuit 13 and damage the second bridge circuit 13. Moreover, the operating power of the second load 16 may be limited by the capacitance of the non-polarized capacitor device 14.

Figure 2:
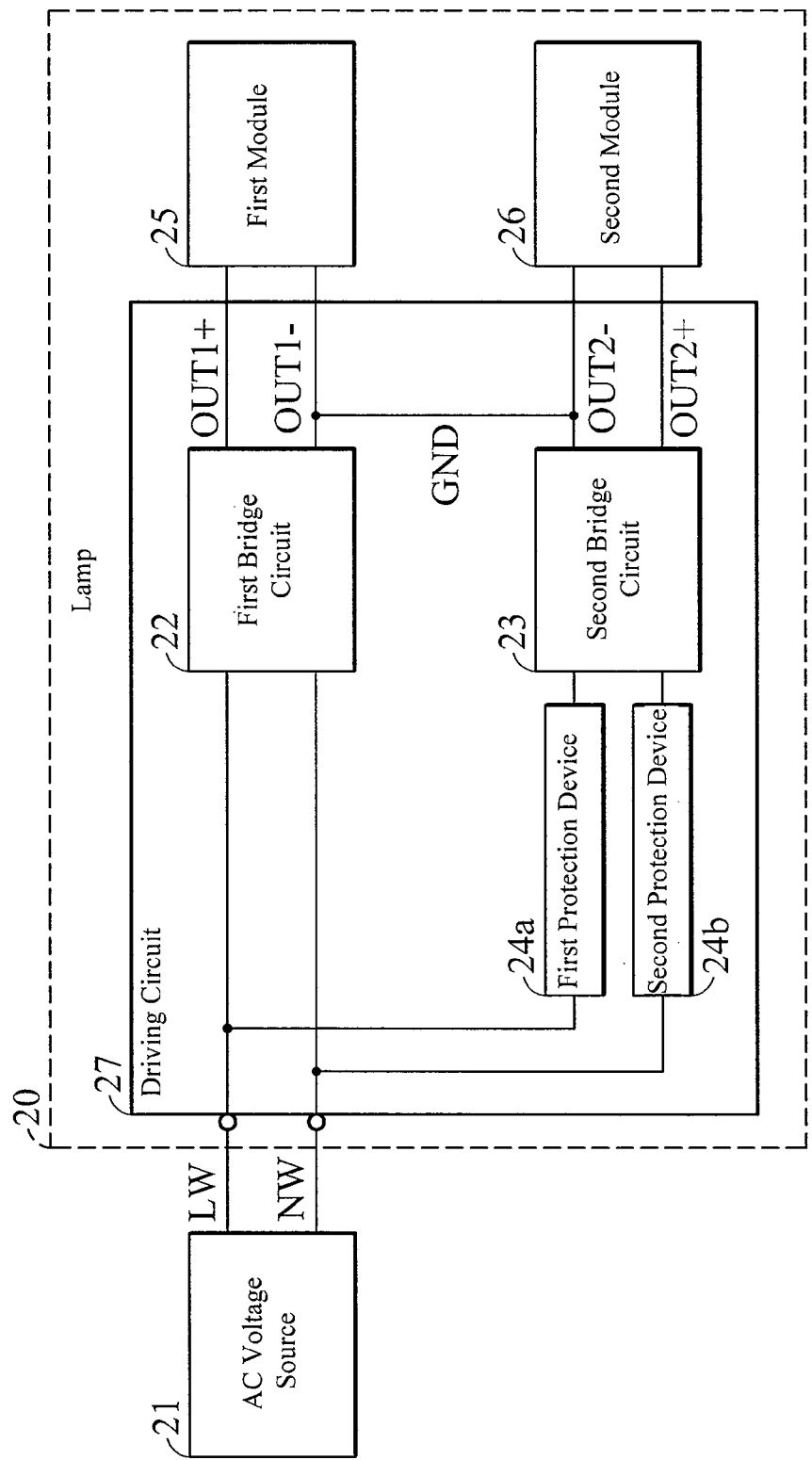
FIG. 2 is a schematic diagram of a lamp according to another embodiment of the invention.

FIG. 2 is a schematic diagram of a lamp according to another embodiment of the invention. A lamp 20 is coupled to an AC voltage source 21. The lamp 20 receives a voltage transmitted by the AC voltage source 21 to drive a first module 25 and a second module 26 in the lamp 20. The lamp 20 includes a driving circuit 27, the first module 25 and the second module 26. The impedance value or the operating power of the first module 25 is greater than the impedance value or the operating power of the second module 26. The driving circuit 27 respectively outputs a first voltage and a second voltage to drive the first module 25 and the second module 26. The first bridge circuit 22 has a positive input terminal coupled to the LW (Live Wire) output terminal of the AC voltage source 21, and a negative input terminal coupled to the NW (Neutral Wire) output terminal of the AC voltage source 21. The first bridge circuit 22 outputs the first voltage to the first module 25 through the first positive output terminal (OUT1+) and the first negative output terminal (OUT1−). A first protection device 24a is coupled between the LW output terminal of the AC voltage source 21 and a positive input terminal of a second bridge circuit 23. A second protection device 24b is coupled between the NW output terminal of the AC voltage source 21 and a negative input terminal of the second bridge circuit 23. The second bridge circuit 23 outputs the second voltage to the second module 26 through the second positive output terminal (OUT2+) and the second negative output terminal (OUT2−).

In this embodiment, the first protection device 24a is a first capacitor and the second protection device 24b is a second capacitor. The operating power of the second module 26 is limited by the capacitance of the first capacitor and the capacitance of the second capacitor. Because the impedance value of the first module 25 is greater than the impedance value of the second module 26, a first current transmitted to the first bridge circuit 22 from the AC voltage source 21 is greater than a second current transmitted to the second bridge circuit 23 from the AC voltage source 21. Therefore, the first current transmitted to the first bridge circuit 22 from the AC voltage source 21 is greater than the second current transmitted to the second bridge 23. Thus, due to the first protection device 24a and the second protection device 24b, the first current can be prevented from being transmitted to the second bridge circuit. In this embodiment, both of the first capacitor and the second capacitor are non-polarized capacitors.

Figure 3:
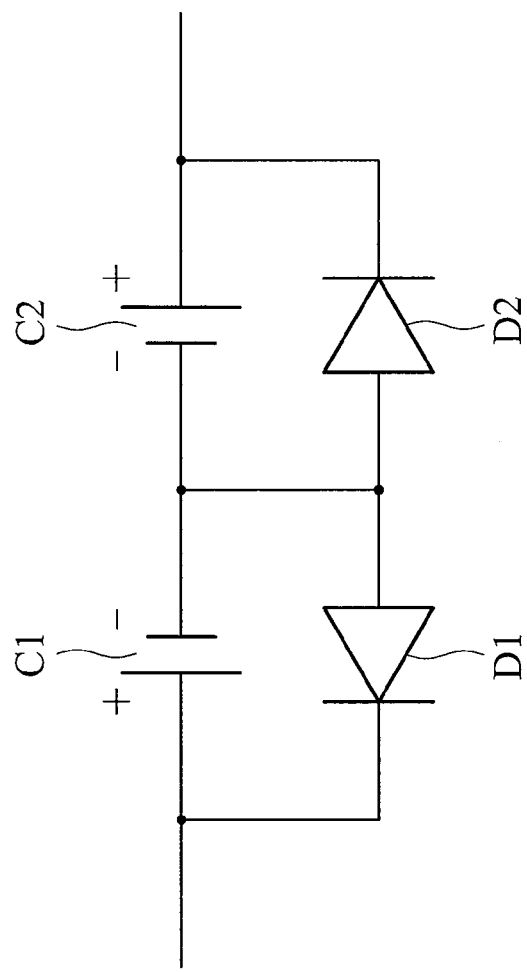
FIG. 3 is a schematic diagram of a non-polarized capacitor according to an embodiment of the invention.

However, general non-polarized capacitors cannot withstand a large voltage, so that the invention provides an equivalent non-polarized capacitor that can withstand the large voltage. FIG. 3 is a schematic diagram of an equivalent non-polarized capacitor according to an embodiment of the invention. The equivalent non-polarized capacitor includes a first capacitor C1, a second capacitor C2, a first diode D1 and a second diode D2. The cathode of the second capacitor C2 is coupled to the cathode of the first capacitor C1. The anode of the first capacitor C1 is coupled to the cathode of the first diode D1. The anode of the first diode D1 is coupled to the anode of the second diode D2. The anode of the second capacitor C2 is coupled to the cathode of the second diode D2. The anode of the first diode D1 is further coupled to the cathode of the first capacitor C1.

Figure 4:
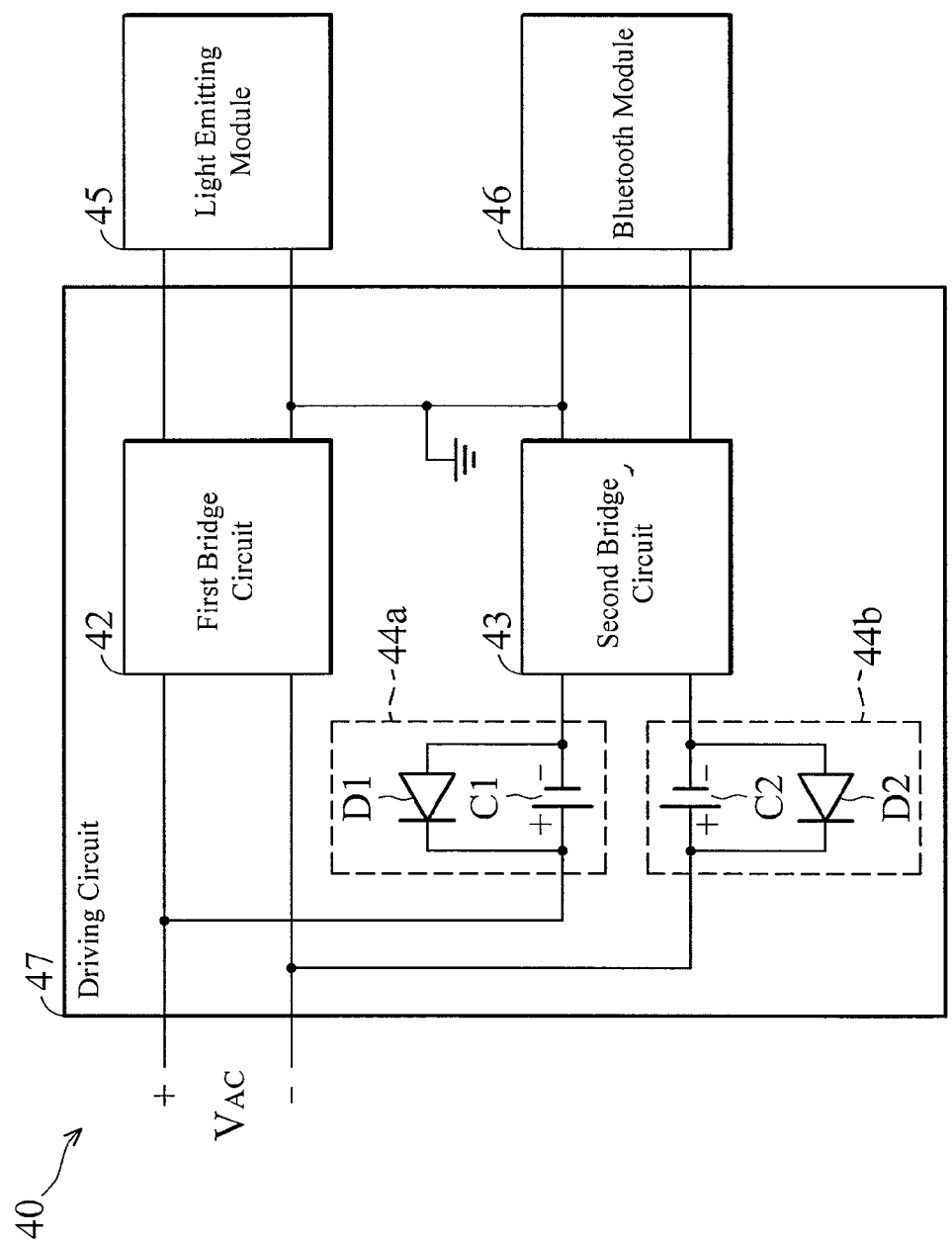
FIG. 4 is a schematic diagram of a lamp according to another embodiment of the invention.

FIG. 4 is a schematic diagram of a lamp according to another embodiment of the invention. A lamp 40 includes a driving circuit 47, a light emitting module 45 and a bluetooth module 46. The driving circuit 47 receives an AC voltage $V_{AC}$ and outputs a first voltage to the light emitting module 45 and a second voltage to the bluetooth module 46. The driving circuit 47 includes a first bridge circuit 42, a second bridge circuit 43, a first protection device 44a and a second protection device 44b. The first protection device 44a is coupled between the AC voltage $V_{AC}$ and the second bridge circuit 43. The first protection device 44a includes a first diode D1 and a first capacitor C1. The anode of the first capacitor C1 is coupled to the cathode of the first diode D1. The cathode of the first capacitor C1 is coupled to the anode of the first diode D1 and a positive input terminal of the second bridge circuit 43. The second protection device 44b is coupled between the AC voltage $V_{AC}$ and the second bridge circuit 43. The second protection device 44b includes a second diode D2 and a second capacitor C2. The anode of the second capacitor C2 is coupled to the cathode of the second diode D2. The cathode of the second capacitor C2 is coupled to the anode of the second diode D2 and a negative input terminal of the second bridge circuit 43.

In this embodiment, the light emitting module 45 requires a large driving voltage and current, while the bluetooth module only requires a small driving voltage and current. To avoid that the second bridge circuit 43 is damaged since the current inputted into the light emitting module is fed back to an input terminal of the second bridge circuit 43 through the light emitting module 45 and a negative output terminal of the second bridge circuit 43, the first protection device 44a and the second protection device 44b are additionally configured at two input terminals of the second bridge circuit 43. Moreover, the operating power of the bluetooth module 46 can be limited by adjusting the capacitances of the first capacitor C1 in the first protection device 44a and the second capacitor C2 in the second protection device 44b. Thus the effect of protecting the bluetooth module 46 also can be realized.

Figure 5:
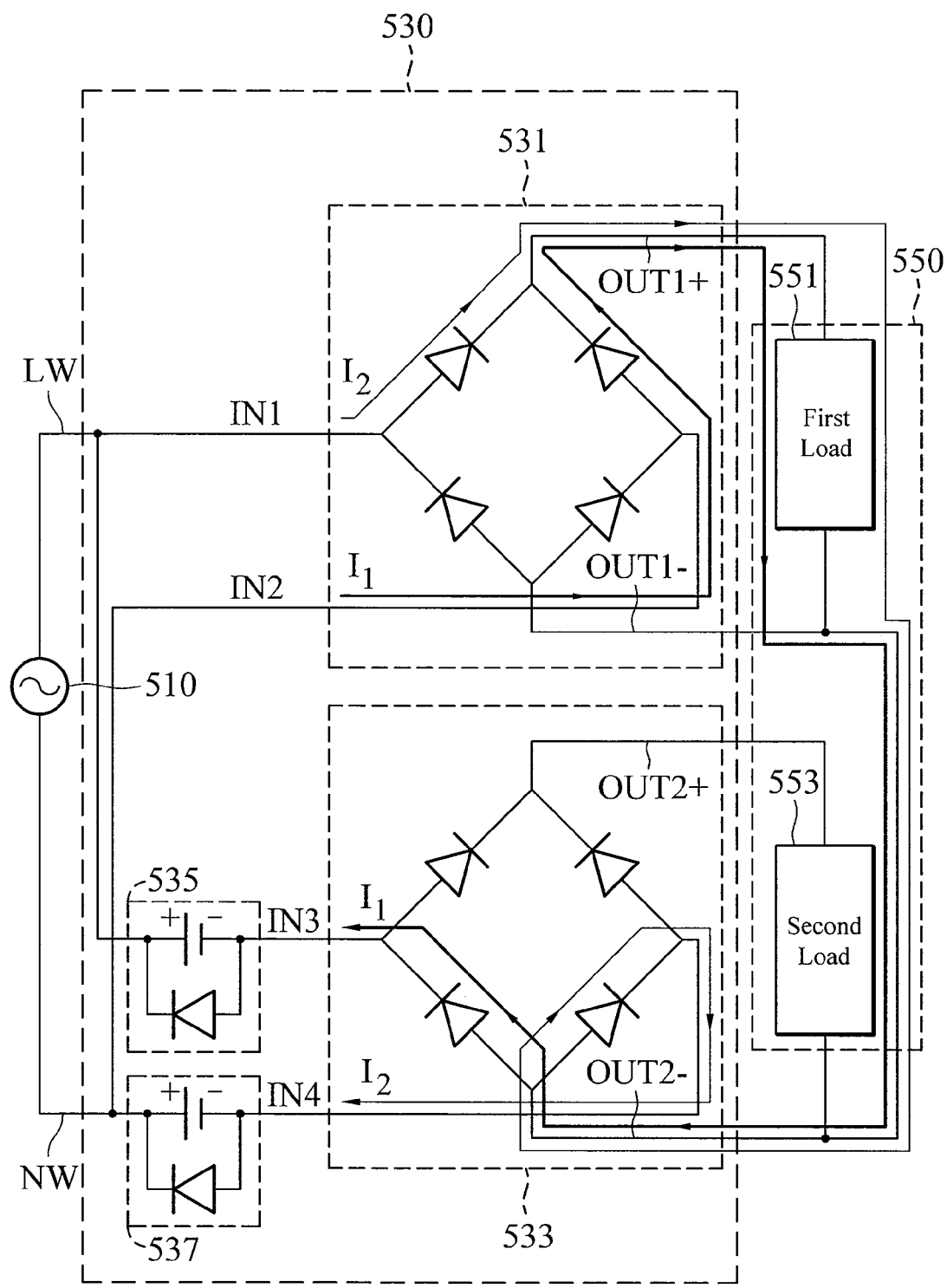
FIG. 5 is a circuit diagram of a driving circuit according to another embodiment of the invention.
Figure 6:
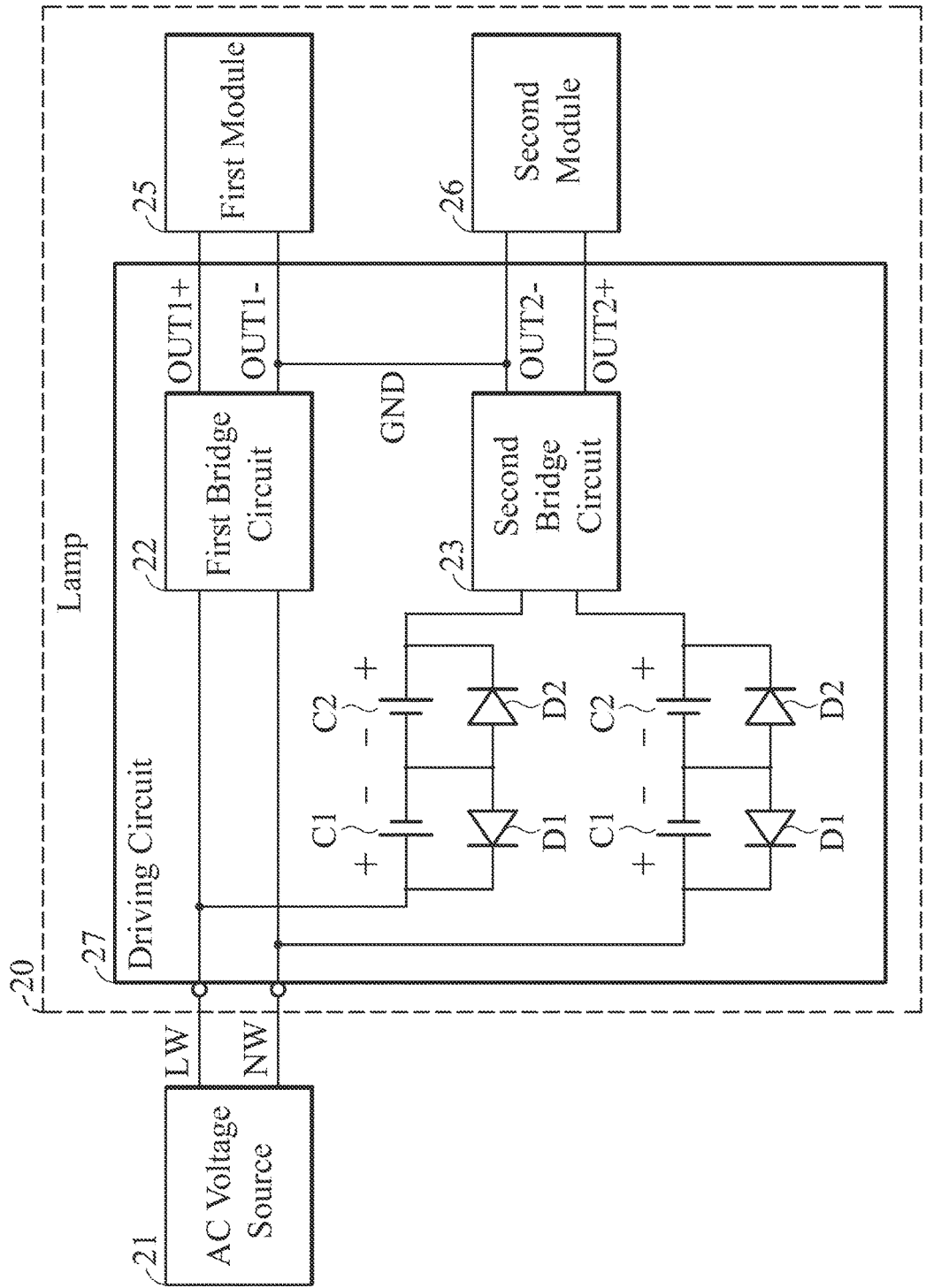
FIG. 6 is a schematic diagram of a combination of the lamp of FIG. 2 and a non-polarized capacitor of FIG. 3, according to another embodiment of the invention.

FIG. 5 is a circuit diagram of a driving circuit according to another embodiment of the invention. A driving circuit 530 is coupled between an AC voltage source 510 and a load module 550. The load module 550 includes a first load 551 and a second load 553 respectively driven by different voltages. A first bridge rectifying unit 531 has a first input terminal (IN1), a second input terminal (IN2), a first positive output terminal (OUT1+) and a first negative output terminal (OUT1−). The first input terminal IN1 and the second input terminal IN2 are coupled to the AC voltage source 510 respectively through a live wire (LW) and a neutral wire (NW). The first load 551 is coupled between the first positive output terminal OUT1+ and the first negative output terminal OUT1−. A second bridge rectifying unit 533 has a third input terminal (IN3), a fourth input terminal (IN4), a second positive output terminal (OUT2+) and a second negative output terminal (OUT2−). The third input terminal IN3 and the fourth input terminal IN4 are coupled to the AC voltage source 510 respectively through the live wire (LW) and the neutral wire (NW). The second load 553 is coupled between the second positive output terminal OUT2+ and the second negative output terminal OUT2−. The second negative output terminal OUT2− is coupled to the first negative output terminal OUT1−.

The first protection device 535 is coupled between the AC voltage source 510 and the third input terminal IN3 to avoid that a first current I1 is fed back to the third input terminal IN3 from the second input terminal IN2 through the first load 551 and the second negative output terminal OUT2−. The second protection device 537 is coupled between the AC voltage source 510 and the fourth input terminal IN4 to avoid that a second current I2 is fed back to the fourth input terminal IN4 from the first input terminal IN1 through the first load 551 and the second negative output terminal OUT2−. The circuit connection method of the first protection device 535 and the second protection device 537 is the same as that of the first protection device 44a and the second protection device 44b in FIG. 4, and it is not illustrated any more.

Although embodiments of the invention have been illustrated in the foregoing, these embodiments are not intended to limit the implementation scope of the invention. That is, simple equivalent variations and modifications made according to the claims and the description of the invention all fall within the scope of the invention. Additionally, any embodiment or the claim of the invention is not necessary to reach the whole purposes, advantages or features disclosed in the invention. Moreover, the abstract and title are only used for assisting in searching a patent document, and are not intended to limit the claims of the invention.

What is claimed is:

1. A driving circuit, comprising:
   a first bridge circuit, wherein the first bridge circuit is coupled to an AC voltage source to output a first voltage, and the first bridge circuit comprises a first positive input terminal, a first negative input terminal, a first positive output terminal and a first negative output terminal;
   a second bridge circuit, wherein the second bridge circuit is coupled to the AC voltage source to output a second voltage, and the second bridge circuit comprises a second positive input terminal, a second negative input terminal, a second positive output terminal and a second negative output terminal, wherein the second negative output terminal and the first negative output terminal are coupled to the same ground potential;
   a first protection device coupled between the second positive input terminal and the AC voltage source, wherein the first protection device comprises a first capacitor and a first diode connected to the first capacitor; and
   a second protection device coupled between the second negative input terminal and the AC voltage source, wherein the second protection device comprises a second capacitor and a second diode connected to the second capacitor,
   wherein the first capacitor and the second capacitor are polarized, a cathode of the first capacitor is directly connected to an anode of the first diode and the second positive input terminal of the second bridge circuit, an anode of the first capacitor is directly connected to a cathode of the first diode, a cathode of the second capacitor is directly connected to an anode of the second diode and the second negative input terminal of the second bridge circuit, and an anode of the second capacitor is directly connected to a cathode of the second diode;
   wherein the first protection device and the second protection device are configured for avoiding that an input current inputted from the first positive input terminal or the first negative input terminal of the first bridge circuit is fed back to the second positive input terminal or the second negative input terminal of the second bridge circuit.

2. The driving circuit of claim 1, wherein the first bridge circuit is coupled to a first load, the second bridge circuit is coupled to a second load, and a first impedance value of the first load is greater than a second impedance value of the second load.

3. The driving circuit of claim 1, wherein a power of the second bridge circuit is limited by the capacitance of the first capacitor and the capacitance of the second capacitor.

4. A lamp, comprising:
   a driving circuit, comprising:
   a first bridge circuit, wherein the first bridge circuit is coupled to an AC voltage source to output a first voltage, and the first bridge circuit comprises a first positive input terminal, a first negative input terminal, a first positive output terminal and a first negative output terminal;
   a second bridge circuit, wherein the second bridge circuit is coupled to the AC voltage source to output a second voltage, and the second bridge circuit comprises a second positive input terminal, a second negative input terminal, a second positive output terminal and a second negative output terminal, wherein the second negative output terminal and the first negative output terminal are coupled to the same ground potential;
   a first protection device coupled between the second positive input terminal and the AC voltage source; and
   a second protection device coupled between the second negative input terminal and the AC voltage source;
   a light emitting module receiving the first voltage and enabled by the first voltage; and
   a bluetooth module receiving the second voltage and enabled by the second voltage,
   wherein the first protection device comprises a first capacitor and a first diode connected to the first capacitor and the second protection device comprises a second capacitor and a second diode connected to the second capacitor, and the first capacitor and the second capacitor are polarized, a cathode of the first capacitor is directly connected to an anode of the first diode and the second positive input terminal of the second bridge circuit, an anode of the first capacitor is directly connected to a cathode of the first diode, a cathode of the second capacitor is directly connected to an anode of the second diode and the second negative input terminal of the second bridge circuit, and an anode of the second capacitor is directly connected to a cathode of the second diode;
   wherein the first protection device and the second protection device are configured for avoiding that an input current inputted from the first positive input terminal or the first negative input terminal of the first bridge circuit is fed back to the second positive input terminal or the second negative input terminal of the second bridge circuit.

5. The lamp of claim 4, wherein a power of the second bridge circuit is limited by capacitances of the first capacitor and the second capacitor.

* * * * *